(12) United States Patent
Pannenborg

(10) Patent No.: US 6,447,579 B1
(45) Date of Patent: Sep. 10, 2002

(54) PROCESS FOR DEGASSING LIQUIDS

(76) Inventor: Jens Pannenborg, 14a, D-53797 Lohmar (DE)

( * ) Notice: Subject to any disclaimer, the term of this patent is extended or adjusted under 35 U.S.C. 154(b) by 0 days.

(21) Appl. No.: 09/355,902

(22) PCT Filed: Feb. 5, 1998

(86) PCT No.: PCT/EP98/00631
§ 371 (c)(1),
(2), (4) Date: Aug. 5, 1999

(87) PCT Pub. No.: WO98/34709
PCT Pub. Date: Aug. 13, 1998

(30) Foreign Application Priority Data

Feb. 6, 1997 (DE) .......................................... 197 04 298

(51) Int. Cl.[7] .............................................. B01D 19/00
(52) U.S. Cl. ............................. 95/247; 95/254; 95/266; 96/156; 96/193
(58) Field of Search .......................... 96/155, 156, 193; 95/241, 243, 247, 254, 266

(56) References Cited

U.S. PATENT DOCUMENTS

| | | | |
|---|---|---|---|
| 3,177,919 A | * | 4/1965 | Arant |
| 3,339,346 A | * | 9/1967 | Buchanan |
| 3,460,319 A | * | 8/1969 | Tkach |
| 3,538,682 A | * | 11/1970 | Chattin et al. |
| 4,341,534 A | * | 7/1982 | Burger |
| 4,345,920 A | * | 8/1982 | Ross |
| 4,407,665 A | | 10/1983 | Lasater |
| 4,456,172 A | * | 6/1984 | Roffelsen |
| 5,203,890 A | | 4/1993 | Tatsuo |
| 5,314,613 A | * | 5/1994 | Russo |
| 5,858,070 A | * | 1/1999 | Halm et al. |

FOREIGN PATENT DOCUMENTS

| | | |
|---|---|---|
| DE | 583763 | 9/1923 |
| DE | 224223 | 7/1985 |
| EP | 377146 | 7/1990 |

* cited by examiner

Primary Examiner—Duane S. Smith
(74) Attorney, Agent, or Firm—Wall Marjama & Bilinski LLP

(57) ABSTRACT

Process and apparatus for degassing liquids, namely water, with mobile and stationary application, according to the principle of underpressure generation by suctioning a portion of the liquid from the chamber, which, after the degassing, is filled automatically again with gas-containing liquid, whereupon the next degassing cycle occurs.

7 Claims, 2 Drawing Sheets

PROCESS FOR DEGASSING LIQUIDS

BACKGROUND OF THE INVENTION

The invention relates to a process for degassing liquids in closed systems by applying a pressure which is lower compared to the system pressure.

PRIOR ART

In removing gases from liquids, primarily from water, one generally differentiates between 1. removing (venting) excess gases which exceed the specific solution equilibrium,
2. driving out (degassing) chemically dissolved gases.

1.) Gases comprised in excess in water generally present considerable problems in circulating systems (heating systems, cooling systems, air-conditioning systems). As extremely fine air bubbles, they generate flow noises, cavitation and erosion in the materials and degrade the uniform heat transport in the pipe network and on the surfaces provided for the heat exchange, such as coolers and heating surfaces.

To avoid these problems, ventilation equipment is produced which operates generally with a stop valve disposed in a chamber and connected with a float. When the chamber is filled, the rising float closes the valve. Conversely, the float opens the valve when air enters the chamber. Such ventilation devices are frequently air collection pots, cyclone pots or vessels with massive bodies which are intended for the extremely fine air bubbles to combine into larger ones in order to rise subsequently in the chamber of the ventilator.

2.) If greater gas volumes are comprised in the water than are necessary for chemical saturation, this quantity represents a feeding reservoir to reestablish the natural saturation concentration which is lost, for example, through the reaction of a gas with the materials in the solution. In order to drive out the excess gas and also the gases comprised in the solution, thermal degassing equipment is being manufactured in which, on the one hand, by increasing the temperature, the gas solubility is reduced and, on the other hand, the expulsion effect is enhanced thereby that steam is forced through the water to be degassed and the resulting steam bubbles entrain the gas particles in the water and carry them outside to the outside atmosphere.

Other devices generate a reduced pressure above the level of the liquid whereupon the gases also escape to the surface.

DISADVANTAGES OF PRIOR ART

Regarding 1.)

According to Henry's law, ventilation devices can only remove those quantities of gas which are greater than the factors temperature, pressure and medium properties permit in terms of solubility. In principle, in a circulating system two different pressure regions always obtain between intake and pressure region of a circulation pump such that in theory a ventilator disposed on the intake side of a pump should transport gas out of the system. But in practice, narrow limits are set because the ventilator must be under minimum pressure so that its float chamber remains filled. Otherwise the float drops and opens the ventilation valve such that air can be drawn in via the ventilator (the ventilator becomes an aerator).

But if a minimum pressure is required on the low-pressure side, the air can only be incompletely removed. A further disadvantage of this type of ventilation is that, due to the high flow rate of the water, the microbubbles can only reach the float chamber of the ventilator in small quantities if at all.

Regarding 2.)

According to Henry's gas law, as expanded by Dalton, the partial pressure acting upon a solution, the temperature and the type of medium determine the solubility of gases. With the known technique of thermal degassing, extremely good results can be attained in this regard. A marked disadvantage of this technique, however, is that it requires large and expensive equipment: a steam generator for producing the expulsion steam and a collecting vessel with degasser device comprising large distributor surfaces on which the water can be exposed to the steam. Part of this equipment includes extensive tubing, regulating elements, control means and the safety technique of steam operation. Such thermal degasser installations are a fixed standard component in steam generation installations.

In closed cooling water circuits, heating or cooling water circulations, they are neither economically nor practically applicable since the degassed water would have to be heated and subsequently cooled again to the circulation temperature.

The problem is similar in so-called fast steam generators in which a relatively small system water quantity is present and for which a thermal degassing installation would be too large.

SUMMARY OF THE INVENTION

Required is a cost-effective apparatus for mobile and stationary application, with which excess gas, as well as also the chemically dissolved gases, can be removed from a liquid (for example water). It should not be necessary to raise the temperature of the liquid to be degassed and the apparatus should be operable in a simple manner and require low energy for its operation.

Solution

The task is solved according to the invention thereby that from a water system a portion of the water is extracted and transferred to the degassing container of the described apparatus. By extracting a portion of the liquid and transporting it to a storage container the total pressure (and thus the partial pressures on all gases) is lowered in the degassing container so far that the boiling point of the liquid is exceeded and the liquid boils. The solution equilibrium of the dissolved gases shifts toward the left and as a consequence all excess gases are driven out with the steam bubbles. The temperature of the liquid is not raised.

BRIEF DESCRIPTION OF THE DRAWINGS

For a better understanding of the present invention and other objects relating thereto, reference will be made to the following detailed description of the invention which is to be read in association with the accompanying drawings wherein.

DESCRIPTION OF THE INVENTION

The invention relates to a process for degassing liquids under low pressure with the associated equipment either connected in parallel with the circulation system or, in batch operation, from a first container with gas-containing liquid a specific quantity is extracted, degassed and transferred to a second closed container.

Figure 1:
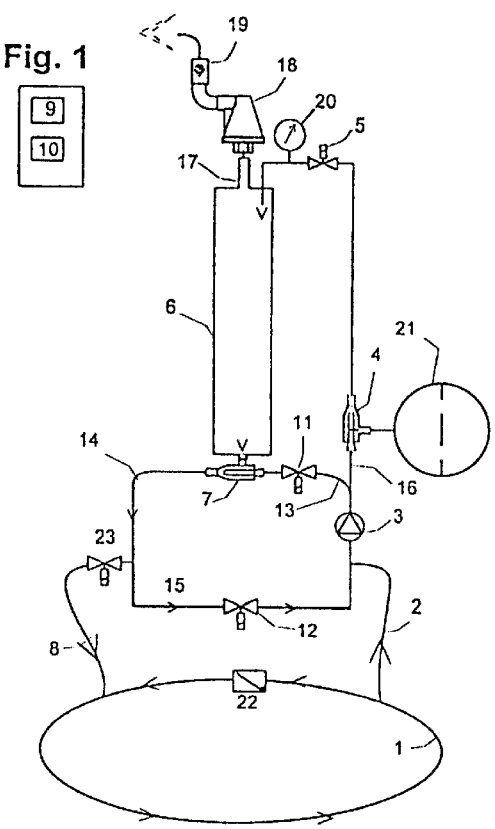
FIG. 1 is a schematic representation of the degassing apparatus of the present invention.

FIG. 1 shows such a degassing apparatus. By means of a pump (3) from a circulation (1) via a line segment (2) liquid is removed, pumped via a jet pump (4) and an automatic valve (5) through a container (6) and from there is transferred via a jet pump (7) and line segments (14), (8) and the automatic valve (23) back into the circulation (1). The automatic valves (11) and (12) are closed. A circulation is generated in the course of which through the container (6) gas-containing circulating water is flushed. The jet pump (4) empties the diaphragm pressure storage (21) completely and recycles the liquid stored there back into the circulating cycle. The circulation time can be set to be of any desired length via a timer clock (9).

At the end of the circulation time the timer clock (10) starts the evacuation time. Automatic valves (11) and (12) are opened and automatic valves (5), (23) are closed. The liquid is now pumped in a cycle by pump (3) via the line segment (13) through the automatic valve (11) and through the jet pump (7), further via line segments (14) and (15) through the automatic valve (12). In the jet pump (7) a strong current is generated such that on the intake side of the jet pump (7) a very strong underpressure is generated. In this way the liquid is drawn from the container (6) and forced with the circulation flow via line segments (14), (15), (13) into the partial line segment (16) and subsequently through the jet pump (4) into the diaphragm storage (21). The size of the diaphragm storage (21) and its gas supply pressure are calculated and determined according to the liquid quantity equal to the evacuation quantity to be displaced. Depending on the setting of the underpressure and the liquid temperature, the liquid starts to boil spontaneously in container (6). The driven-out gases rise into the upper pipe outlet (17) of container (6) and further into the float chamber of the ventilator (18). At this point in time they are not yet capable of escaping into the atmosphere via the check valve (19) since in the container (6) underpressure still obtains. After the expiration of the evacuation time set on the timer clock (10), the circulation time starts again on the timer clock (9). The functions performed during the circulation time have already been described above. During the circulation the container (6) is again filled completely and the system pressure is exerted onto it. All steam bubbles condense and the gases driven out collect in the pipe outlet (17) as well as in the ventilator (18). The liquid level rises into the ventilator (18) and forces the gases through the ventilator (18) and the check valve (19) to the outside. A manometer (20) has two functions. It indicates the excess pressure as well as also the underpressure during the operating cycles 'circulation' and 'evacuation'.

Figure 1A:
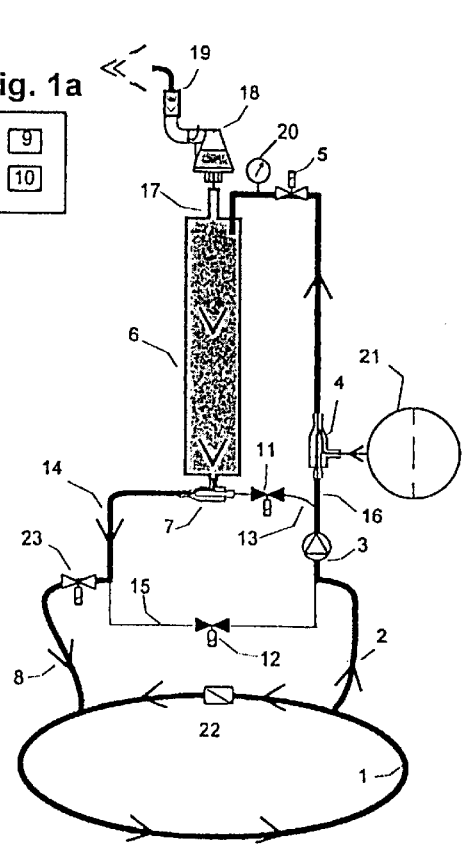
FIG. 1a illustrates the flow path of fluids in the apparatus shown in FIG. 1 when the apparatus is in a circulation mode.

FIG. 1a shows the flow paths in the degassing apparatus in the switched state 'circulation', i.e. charging the apparatus with gas-containing circulating water. During the circulation the check valve (22) prevents a shortcircuit between the water inlet and the water outlet of the main circulation.

Figure 1B:
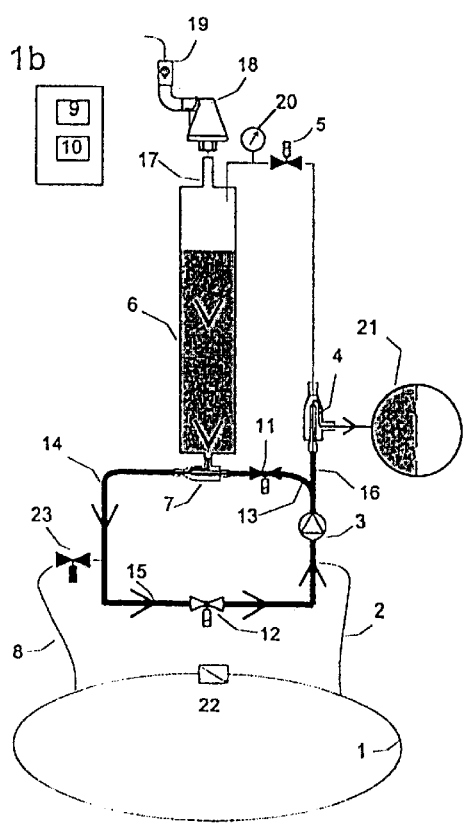
FIG. 1b illustrates the flow path of fluid when the apparatus is in an evacuation mode.

FIG. 1b depicts the flow paths in the degassing apparatus in the switched state 'evacuation', i.e. of the degassing of the liquid present in container (6).

Figure 2:
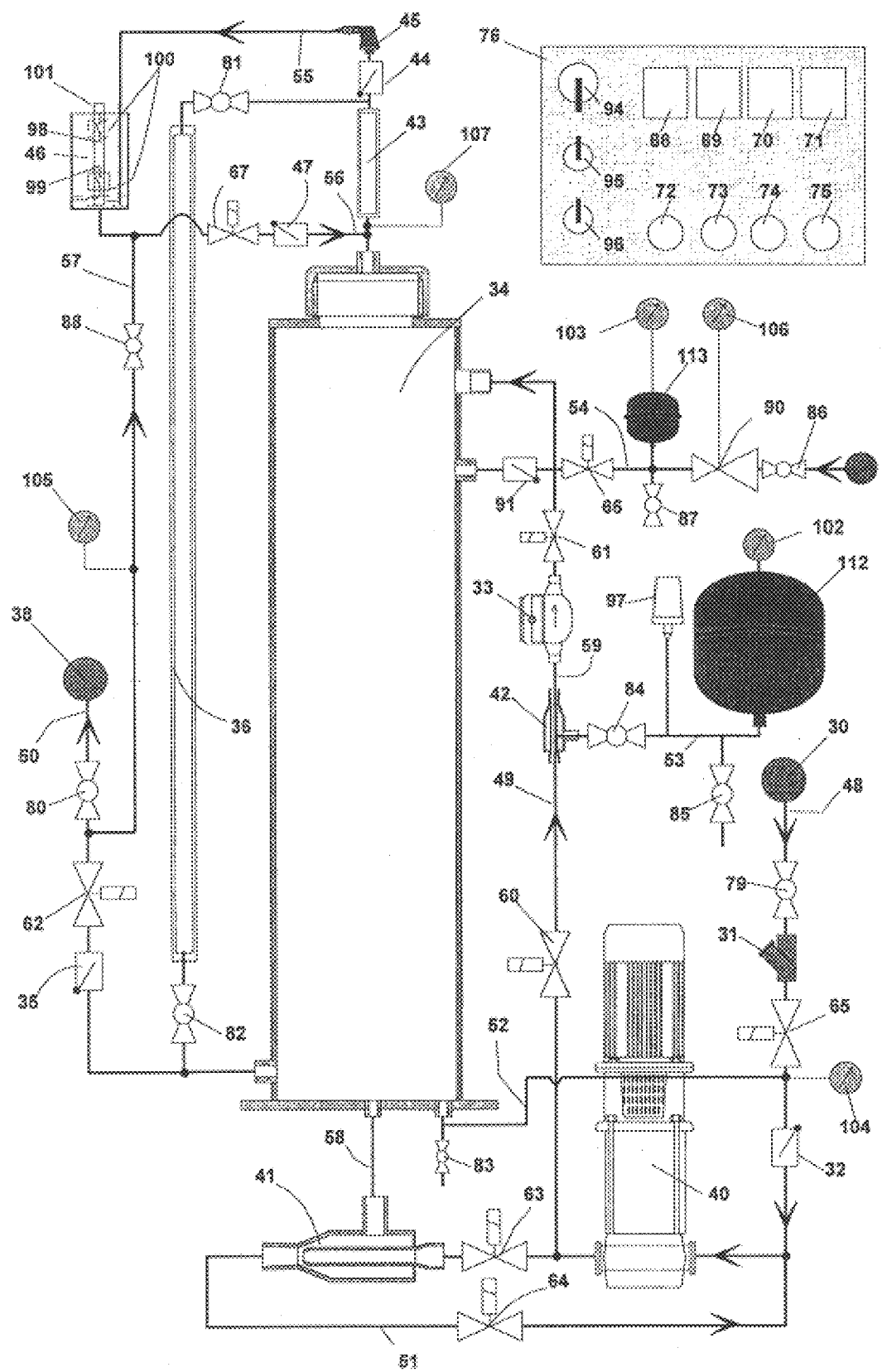
FIG. 2 illustrates a further embodiment of the invention.

FIG. 2 shows an apparatus functionally identical with FIGS. 1, 1a and 1b, however, additionally equipped with a device for collecting and recycling of condensate, as well as with an additional device for replenishing the volume loss, generated during the degassing, with an equal quantity of water.

DESCRIPTION

Basic settings of the valves with the installation switched off before starting operation:

Manual valves 81, 82, 84, 86 are open.

Manual valves 79, 80, 83, 85, 87, 88 are closed.

Automatic valves 60, 61, 62, 63, 64, 65, 66, 67 are closed

Preparing installation for operation:

The installation is filled via the replenishment line segment 54. For this purpose a switch 95 is set to "off", and switches 94 and 96 are switched to "on". If switch 96 is switched to "on", the automatic valve 66 opens and the replenishment water can flow into the installation to the extent the pressure reducer valve 90 is opened.

The installation is now filled via the replenishment line segment 54. The air escapes via the exhaust line segment 55. The filling process is completed when no air escapes via the pipe line segment and the manometers 104, 106, 105 and 107 indicate identical pressure.

During the filling process the pressure reducer valve 90 is preset toward the end of the fill time to the system pressure obtaining at the inlet point 30. Subsequently the manual valves 79 and 80 are opened. Thereby within the degasser installation and the water system to be degassed an identical pressure develops.

By adjusting the restoring pressure on the pressure reducer valve 90 the final system pressure can be corrected during the degassing.

The supply pressures of the diaphragm expansion vessels (MAG) 112 and 113 are set with the installation switched on (main switch 94 to "on") and the pump switched on (switch 95 to "on") on the manometer 107 are set to the pressure obtaining during the time of the transfer by pumping (timer 68).

To set the supply pressure in the MAGs, the manual valves 86 and 84 are closed, subsequently the manual valves 85 and 87 are opened until the MAGs are empty of water. Subsequently the valves are closed again and the gas supply pressure is set in the MAGs by means of nitrogen gas to the previously read-off display of the manometer 107. The installation is now ready to start and the vacuum degassing can start:

Timertime1=Timer 68: transfer by pumping, exchange of water content.

Switch 95 switches on pump 40. Subsequently the program flow is reset by briefly switching on/off the switch 94.

A pump 40 draws water from a water system via the junction point 30 and the pipe line segment 48, passing through a dirt trap 31 and a check valve 32, transports it via the pipe line segment 49 into the vacuum vessel or closed container 34 further via the pipe line segment 50 and the junction point 38 back into the water system. The automatic valves 60, 61, 62, 65, 66 are opened for this purpose; 63, 64, 67 remain closed. During the transfer process by pumping, through the jet pump 42 via the pipe line segment 53 the MAG 112 is emptied completely by suction provided it was not completely emptied during the preceding operating step (see below). The pressure on the manometer 102 falls to the supply pressure set in the MAG. In this way it is possible to check whether or not the supply pressure of the MAG 122 is still correct. The time of the transfer by pumping is determined by setting the timer 68 in the control switchboard 76. The transfer quantity is counted by the contact water meter 33. It transmits 11 pulses which are indicated on the control switchboard 76 through light 72. In this way it is possible to determine via the time setting on timer 68 the transfer quantity (exchange quantity).

Timertime2=timer 69: suctioning vacuum

At the completion of time 68 the switch positions of the automatic valves change:

Valves 60, 63, 64 are open.

Valves 61, 62, 65, 66, 67 are closed.

Valve 67 can open. Explanations in this regard are explained below.

A fast internal circulation develops in the pipe line segment 51 with the direction pump 40>automatic valve 63, jet pump 41>automatic valve 64 such that on the intake side of the jet pump and the pipe line segment 58 a strong underpressure is generated and water is suctioned out of the vacuum vessel. Thereby at the output of pump 40 a high pressure is generated through which the suctioned water is forced into the MAG 112 through line segment 49, the jet pump 42 (now without effect) and the line segment 53. The display on manometer 102 rises.

Via pipe line segment 52 it is ensured that after the automatic valve 65 a very low pressure obtains such that the valve always closes optimally and, in the presence of a vacuum, no water can flow via the pipe line segment 48 into the installation. With a vacuum present, the exhaust line segment 55 is closed via the check valve 44, the condensate line segment 56 via the automatic valve 67 and the outlet line segment via the check valve 35.

The display on the manometer 107 falls to underpressure. Analogously, the display on the manometer 102 rises. An upper pressure limitation is set on the pressure regulator 97 such that upon reaching an undesirably high pressure the installation switches off automatically and the alarm light 75 lights up. The process of vacuum suction can be observed via the inspection pipe 36, if the manual valves 81 and 82 are open.

If the condensate collection vessel 46 is filled at the beginning of the vacuum suction, i.e. the magnet float 100 of the probe rod 101 is at the upper reed switch 98, the automatic valve 67 opens and the condensate is suctioned back into the installation until the magnet float has reached the lower reed switch 99. During times 68 (transfer by pumping) and 71 (pressure equilibration) the valve 67 cannot open. A residual quantity of condensate remaining after the passage of time 70 (maintaining vacuum) must, if necessary, wait for the next cycle to be suctioned back.

Timertime3=Timer 70: maintaining vacuum

After completion of time 69, the automatic valve 60 is closed. The valve settings at this time are:

Valves 63, 64 are open.

Valves 60, 61, 62, 65, 66, 67 are closed.

Valve 67 can open if the condensate vessel 46 is full (see above).

The internal circulation in the pipe line segment 51 remains extant but no more water is suctioned from the vacuum vessel 34 so that a resting time occurs in which all gas and steam bubbles can rise into the upper region of the vacuum vessel 34 and into the air collection chamber 43. The rise can be observed on the inspection pipe and it is possible to determine in this way the length of the time 70 which must be set. During this time the internal pressure falls as a function of the water temperature and can be read off on the manometer 107.

Timertime4=Timer 71: internal pressure equilibration

At the expiration of time 70 the automatic valve 61 is opened. The valve settings are at this time:

Valves 61, 63, 64 are open.

Valves 60, 62, 65, 66, 67 are closed.

The internal circulation in pipe line segment 51 remains extant. Simultaneously, the water stored in MAG 112 flows via the pipe line segments 53 and 59 into the vacuum vessel 34 such that within the closed installation the pressures can become equilibrated as much as possible.

The cycle starts anew.

Timertime1=Timer 68: transferring by pumping, exchanging water content.

The functions performed in this time have already been described above.

After the installation has completed the times 69=vacuum suctioning, 70=maintaining vacuum, 71=internal pressure equilibration and the transfer time 68 has started anew, through the changed valve position (see above) the vacuum is spontaneously broken so that water vapor formed also spontaneously condenses with the consequence that with valve 66 open in the replenishment line segment 54 the volume deficit generated through the degassing is replaced by replenishment water until the system pressure has reached the pressure set on the pressure reducer valve. Simultaneously, the driven-out gas and a residue of non-condensed water vapor escapes (at last under system pressure) via the exhaust line segment 55 into the condensate collection vessel 46. There line 55 is introduced so deeply that its end is below the residual water level with the result that exiting water vapor can better condense there.

Different apparatus embodiments of the process are possible. For example, the liquid extraction for the purpose of evacuation can take place directly by means of a suction pump or with the aid of a piston moving in the downward direction in a cylinder. The principle of the process is the same, which is the reason for omitting a graphic representation of it at this point.

Attainable Advantages

With the apparatus according to the invention degassing capacities can be achieved which come close to the effect of a thermal degasser. If the issue is driving out oxygen for the purpose of corrosion prevention, the remaining residual quantity of oxygen can usually be tolerated. For the residual corrosion avoidance in special cases either an oxygen-binding chemical product can be added or a corrosion preventive agent which tolerates the presence of oxygen. Since chemical oxygen binders, such as for example sodium sulfite $NaSO_3$, such as are conventionally used for corrosion protection, simultaneously place loading on the system with additional salts, the dangerous oversalting of circulations with, for example, sodium sulfate $NaSO_4$ occurs. The same applies to fast steam generators in which significant quantities of sodium sulfite are used for the purpose of oxygen binding.

By driving out oxygen, considerable quantities of water chemicals can be saved in such water, which free the waste water of the loading.

Applications

Initialization and redevelopment heating systems, cooling water and air-conditioning circulations, degassing of feed water in steam generators, in particular fast steam generators, for stand-down time conservation of steam boilers, degassing of fire protection pipe systems (sprinkler installations) and other applications.

LIST OF REFERENCE NUMBERS ON FIG. 2

30 inlet 31 dirt trap 32 check valve line segment 48
33 contact water counter
34 vacuum vessel
35 check valve line segment 50
36 inspection pipe
37 37
38 outlet
39 39
40 pump
41 vacuum pump 1
42 vacuum pump 2
43 air collection chamber
44 check valve line segment 56 exhaust
45 exhaust valve actuated via float
46 condensate collection vessel
47 check valve line segment 58 suctioning back condensate
48 pipe line segment system water suctioning
49 pipe line segment 1 forcing water into the installation
50 pipe line segment water outlet
51 pipe line segment internal circulation
52 pipe line segment vacuum augmentation
53 pipe line segment MAG1 charging-emptying
54 pipe line segment replenishment fresh water
55 pipe line segment ventilating
56 pipe line segment suctioning back condensate
57 pipe line segment manual filling condensate vessel
58 pipe line segment vacuum suctioning
59 pipe line segment 2 forcing water into the installation
60 MV pump at pressure side
61 MV vacuum vessel input
62 MV vacuum vessel+system output
63 MV jet pump input
64 MV jet pump output
65 MV system+pump input
66 MV fresh water replenishment
67 MV condensate recycling
68 timer transferring by pumping, filling
69 timer suctioning vacuum
70 timer maintaining vacuum
71 timer pressure equilibration
72 light circulation
73 light pump
74 light replenishment
75 light excess pressure
76 control switchboard
77 77
78 78
79 HV system input
80 HV system output
81 FV inspection pipe top
82 HV inspection pipe bottom
83 HV installation emptying
84 HV MAG1 inflow+outflow
85 HV MAG 1 emptying
86 HV replenishment fresh water
87 HV MAG2 emptying
88 HV filling condensate vessel manually
89 89
90 pressure reducer
91 check valve
92 92
93 93
94 switch main
95 switch pump on/off
96 switch replenishment water automatic/manual
97 switch, off, excess pressure
98 reed switch vessel full
99 reed switch vessel empty
100 float with magnet
101 probe rod with 2 reed switches
102 manometer MAG1 actual pressure
103 manometer MAG2 actual pressure
104 manometer degasser input
105 manometer degasser output
106 manometer fresh water after pressure reducer
107 manometer vacuum vessel+pressure
108 108
109 109
110 110
111 111
112 MAG1 water take-up+release
113 MAG2 replenishment after vacuum
114 114
115 115

What is claimed is:

1. Apparatus for degassing a liquid in a closed system that includes:

a vertically disposed closable container for holding a quantity of liquid, said container having a top and a bottom, a circulating loop for liquid containing a circulation pump, an inlet line for bringing liquid from said supply into the circulating loop, said inlet line containing an inlet control valve, an outlet line for returning liquid from said circulating loop back to the supply, said outlet line containing an outlet control valve, a supply line for connecting the circulating loop with the top of said container, said supply line containing a supply control valve which, when open, allows the container to be filled with liquid, a first jet pump for connecting the bottom of said container and said circulating loop, a second jet pump for connecting the supply line to an intermediate diaphragm pressure tank, and control means for closing the control vales and actuating the jet pump so that liquid is drawn from the container and delivered into the pressure tank during a degassing cycle whereby an under pressure is produced in the tank sufficient to release gases from the liquid into the top of said tank.

2. The apparatus of claim 1 that further includes ventilator means in the top of said tank for exhausting gases from said tank.

3. The apparatus of claim 1 that further includes a circulating control valve mounted in said loop, one valve being located between the inlet and outlet liner and the other valve being located between the circulating pump and said first jet pump.

4. The apparatus of claim 1 that includes means for returning the liquid in said pressure tank to the system upon the completion of a degassing cycle.

5. The apparatus of claim 1 wherein said control means further includes means for replenishing the volume of liquid lost during each degassing cycle.

6. A method of degassing a liquid drawn from the closed system, closing the container to the surrounding ambient, using a jet pump and a circulation pump to withdraw a portion in the container so that an under pressure is created in the container such that gases in said liquid escape from said liquid and are collected above said liquid in the top of said container, storing the liquid withdrawn from the container within at least one intermediate pressure tank at about the pressure of said closed system, and evacuating the gases from said container.

7. The method of claim 6 that includes the further step of mixing the liquid stored in the intermediate pressure tank with the liquid in the closed supply at the end of a degassing cycle and adding a portion of the stored liquid to the liquid in the container at the start of a subsequent degassing cycle.

* * * * *